(12) United States Patent
Lu et al.

(10) Patent No.: US 11,021,102 B2
(45) Date of Patent: **\*Jun. 1, 2021**

(54) VEHICULAR RAIN SENSING SYSTEM USING FORWARD VIEWING CAMERA

(71) Applicant: Magna Electronics Inc., Auburn Hills, MI (US)

(72) Inventors: Yuesheng Lu, Farmington Hills, MI (US); Heinz A. Mattern, West Bloomfield, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/929,461

(22) Filed: May 4, 2020

(65) Prior Publication Data

US 2020/0262348 A1   Aug. 20, 2020

Related U.S. Application Data

(63) Continuation of application No. 16/400,488, filed on May 1, 2019, now Pat. No. 10,640,043.

(60) Provisional application No. 62/668,546, filed on May 8, 2018.

(51) Int. Cl.
*B60R 1/00*     (2006.01)
*H04N 5/225*    (2006.01)
*B60R 11/04*    (2006.01)

(52) U.S. Cl.
CPC .......... *B60R 1/00* (2013.01); *B60R 11/04* (2013.01); *H04N 5/2254* (2013.01); *B60R 2300/108* (2013.01)

(58) Field of Classification Search
CPC .......... B60R 1/00; B60R 11/04; H04N 5/2254

USPC .......................................................... 348/148
See application file for complete search history.

(56) References Cited

U.S. PATENT DOCUMENTS

| | | | |
|---|---|---|---|
| 4,871,917 A | 10/1989 | O'Farrell et al. | |
| 5,550,677 A | 8/1996 | Schofield et al. | |
| 5,670,935 A | 9/1997 | Schofield et al. | |
| 5,703,568 A | 12/1997 | Hegyi | |
| 5,949,331 A | 9/1999 | Schofield et al. | |
| 6,353,392 B1 | 3/2002 | Schofield et al. | |
| 6,690,268 B2 | 2/2004 | Schofield et al. | |
| 6,824,281 B2 | 11/2004 | Schofield et al. | |
| 7,038,577 B2 | 5/2006 | Pawlicki et al. | |

(Continued)

FOREIGN PATENT DOCUMENTS

DE   102010023593 A1   12/2011

*Primary Examiner* — Nguyen T Truong
(74) *Attorney, Agent, or Firm* — Honigman LLP

(57) ABSTRACT

A method for determining presence of water droplets at an outer side of a vehicle windshield includes equipping a vehicle with a vehicular vision system having a camera disposed behind an inner side of the vehicle windshield so as to view exterior of the vehicle through the windshield. The camera includes a primary lens, a secondary lens and an imager, which has a primary sensing area and a secondary sensing area. Image data representative of images focused at the imager by the primary lens is captured at the primary sensing area of the imager. Image data representative of images focused at the imager by the secondary lens is captured at the secondary sensing area of the imager. Responsive to processing at the control of image data captured by the imager at the secondary sensing area, presence of water droplets at the outer side of the windshield of the equipped vehicle.

20 Claims, 4 Drawing Sheets

(56) References Cited

U.S. PATENT DOCUMENTS

| | | |
|---|---|---|
| 7,480,149 B2 | 1/2009 | DeWard et al. |
| 7,720,580 B2 | 5/2010 | Higgins-Luthman |
| 7,855,755 B2 | 12/2010 | Weller et al. |
| 8,256,821 B2 | 9/2012 | Lawlor et al. |
| 10,640,043 B2 | 5/2020 | Lu et al. |
| 2009/0295181 A1 | 12/2009 | Lawlor et al. |
| 2014/0160284 A1 | 6/2014 | Achenbach et al. |
| 2014/0226012 A1 | 8/2014 | Achenbach |
| 2015/0015713 A1 | 1/2015 | Wang et al. |
| 2015/0327398 A1 | 11/2015 | Achenbach et al. |
| 2016/0006922 A1 | 1/2016 | Boudreau et al. |

VEHICULAR RAIN SENSING SYSTEM USING FORWARD VIEWING CAMERA

CROSS REFERENCE TO RELATED APPLICATIONS

The present application is a continuation of U.S. patent application Ser. No. 16/400,488, filed May 1, 2019, now U.S. Pat. No. 10,640,043, which claims the filing benefits of U.S. provisional application Ser. No. 62/668,546, filed May 8, 2018, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driving assistance system or vision system or imaging system for a vehicle that utilizes one or more cameras (preferably one or more CMOS cameras) to capture image data representative of images exterior of the vehicle, and provides a camera configured to be disposed behind a window of a vehicle (such as a windshield of the vehicle or a glass cover panel) and having a field of view exterior of the vehicle. The camera includes a primary lens, a secondary lens, and at least one imager or image sensor. The at least one imager includes a primary sensing area and a secondary sensing area. The primary sensing area is configured to sense or capture image data representative of images viewed by the primary lens and the secondary sensing area is configured to sense or capture image data representative of images viewed by the secondary lens. A control includes an image processor operable to process image data sensed or captured by the primary sensing area and the secondary sensing area. The control, responsive to image processing of image data captured by the secondary sensing area, is operable to determine a presence of fluid or precipitation or moisture on the glass.

These and other objects, advantages, purposes and features of the present invention will become apparent upon review of the following specification in conjunction with the drawings.

DESCRIPTION OF THE PREFERRED EMBODIMENTS

A vehicle vision system and/or driving assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
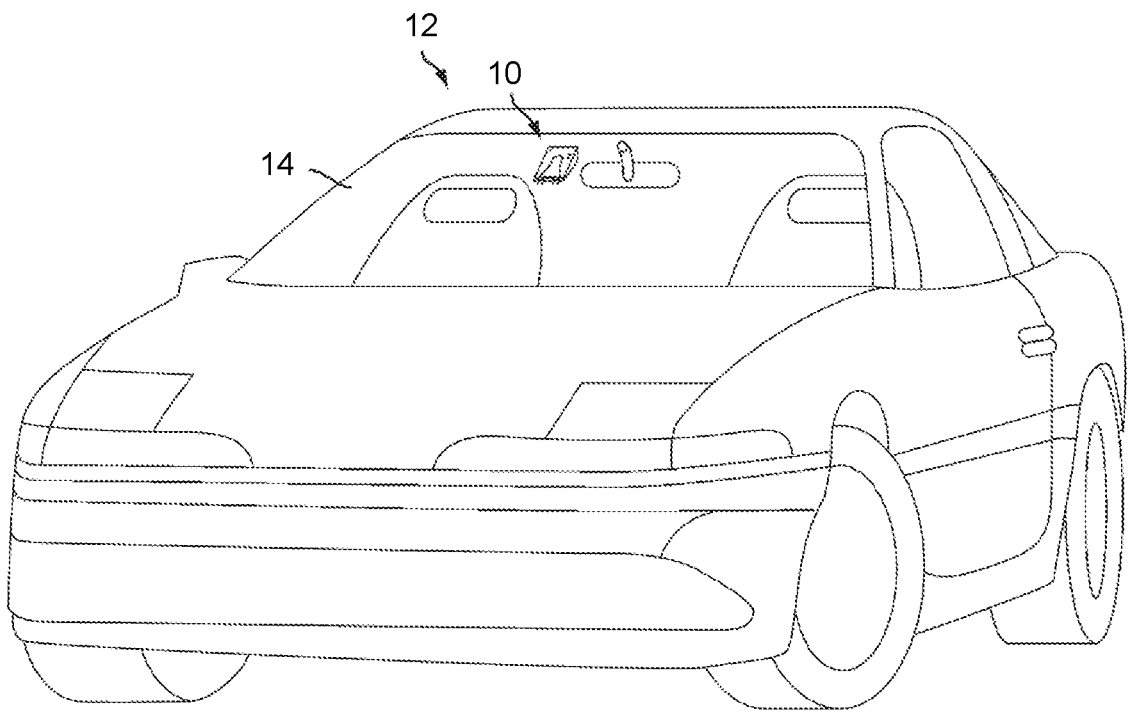
FIG. 1 is a perspective view of a vehicle having a system in accordance with the present invention.

Referring now to the drawings and the illustrative embodiments depicted therein, vision system 10 for a vehicle 12 includes at least one exterior viewing imaging sensor or camera, such as a forward viewing imaging sensor or camera, which may be disposed at and behind the windshield 14 of the vehicle and viewing forward through the windshield so as to capture image data representative of the scene occurring forward of the vehicle (FIG. 1). Optionally, the system may include multiple exterior viewing imaging sensors or cameras, such as a forward viewing camera at the front of the vehicle, and a sideward/rearward viewing camera at respective sides of the vehicle, and a rearward viewing camera at the rear of the vehicle, which capture images exterior of the vehicle. The camera or cameras each include a lens for focusing images at or onto an imaging array or imaging plane or imager of the camera. Optionally, the forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 10 includes a control or electronic control unit (ECU) or processor that is operable to process image data captured by the camera or cameras and may detect objects or the like and/or provide displayed images at a display device for viewing by the driver of the vehicle. The data transfer or signal communication from the camera to the ECU may comprise any suitable data or communication link, such as a vehicle network bus or the like of the equipped vehicle.

Figure 2A:
FIGS. 2A and 2B are exemplary images captured by a forward viewing camera with rain droplets and without rain droplets.
Figure 2B:

Typically, rain sensors are separate from forward viewing cameras or image sensors. In order to reduce cost and/or packaging size (e.g., between the windshield and rear view mirror), an integrated rain sensor is desirable. Typical forward viewing cameras located behind the windshield glass of a vehicle are focused to a distance from a few meters to infinity. Therefore, objects closer than this distance will appear blurry and out of focus. For example, due to the closeness of the camera lens to the windshield, rain droplets on the windshield glass will appear in the camera image as fuzzy or blurry objects that cannot be confidently distinguished from other surrounding objects. FIGS. 2A and 2B illustrate images captures from a typical forward viewing camera with rain droplets on the windshield (FIG. 2A) and no rain droplets on the windshield (FIG. 2B).

Figure 3:
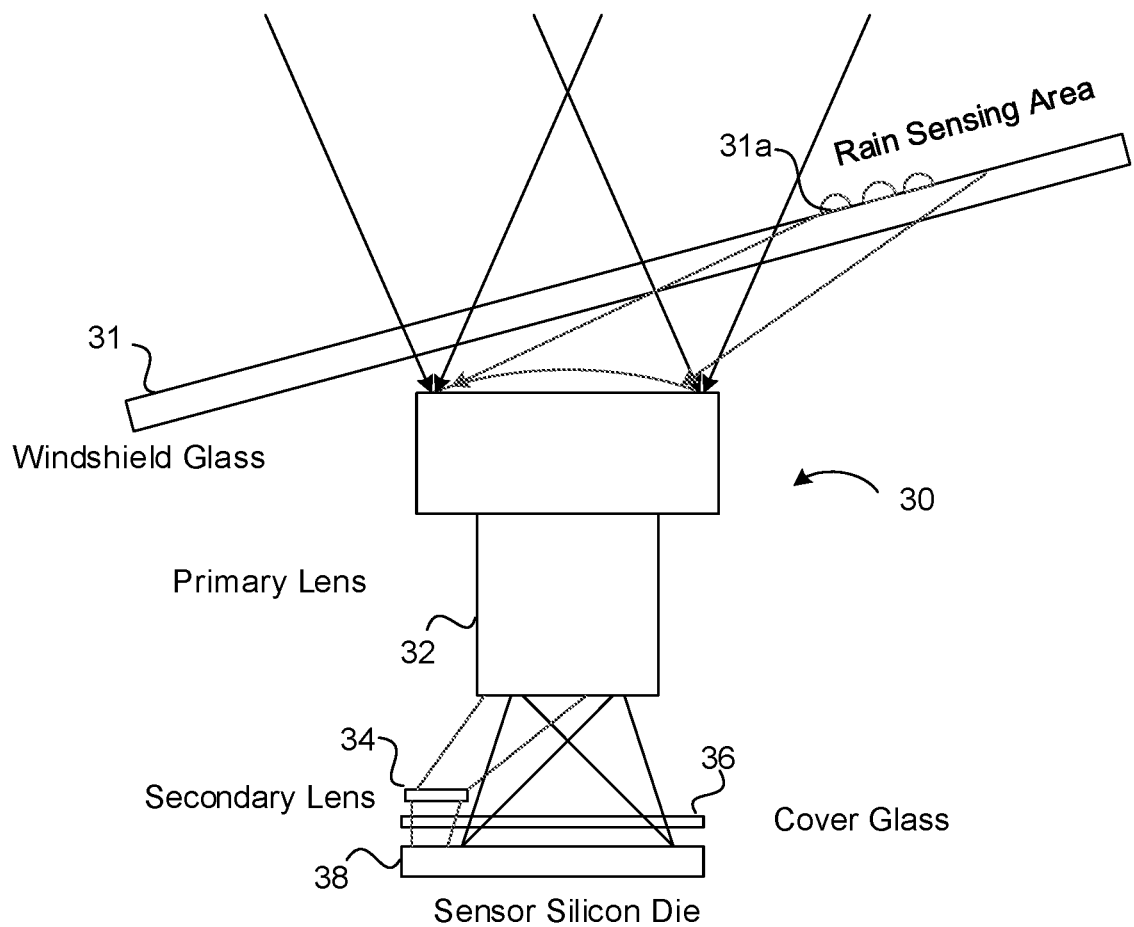
FIG. 3 is a schematic view of a camera in accordance with the present invention.

Referring now to FIG. 3, a forward viewing camera 30 is disposed behind glass (e.g., a windshield) 31. The windshield may have a rain (or other fluid) sensing area 31a. The camera 30 includes a primary lens 32 and a secondary lens 34 that is fixed between the primary lens 32 and an imager or image sensor 38 (e.g., sensor silicon die). In some implementations, a cover glass 36 is disposed between the secondary lens 34 and the image sensor 38. Alternatively, the secondary lens 34 is integrated into the cover glass 36. The primary lens 32 has a working distance or focal distance that is greater than the working distance of the secondary lens 34. The shorter working distance of the secondary lens 34 allows the image sensor 38 to capture images of water droplets on the windshield region 31a that are in focus. As an analogy, the secondary lens 34 acts as a correction lens for a person with "far-sightedness vision," that is, the secondary lens 34 helps to focus objects for the image sensor 38 that are too close for the primary lens 32 to focus. The secondary lens 34 may be in the form of Fresnel lens, a cylindrical lens, a micro lens array or other forms or types of lenses that are generally convex in nature.

Figure 4:
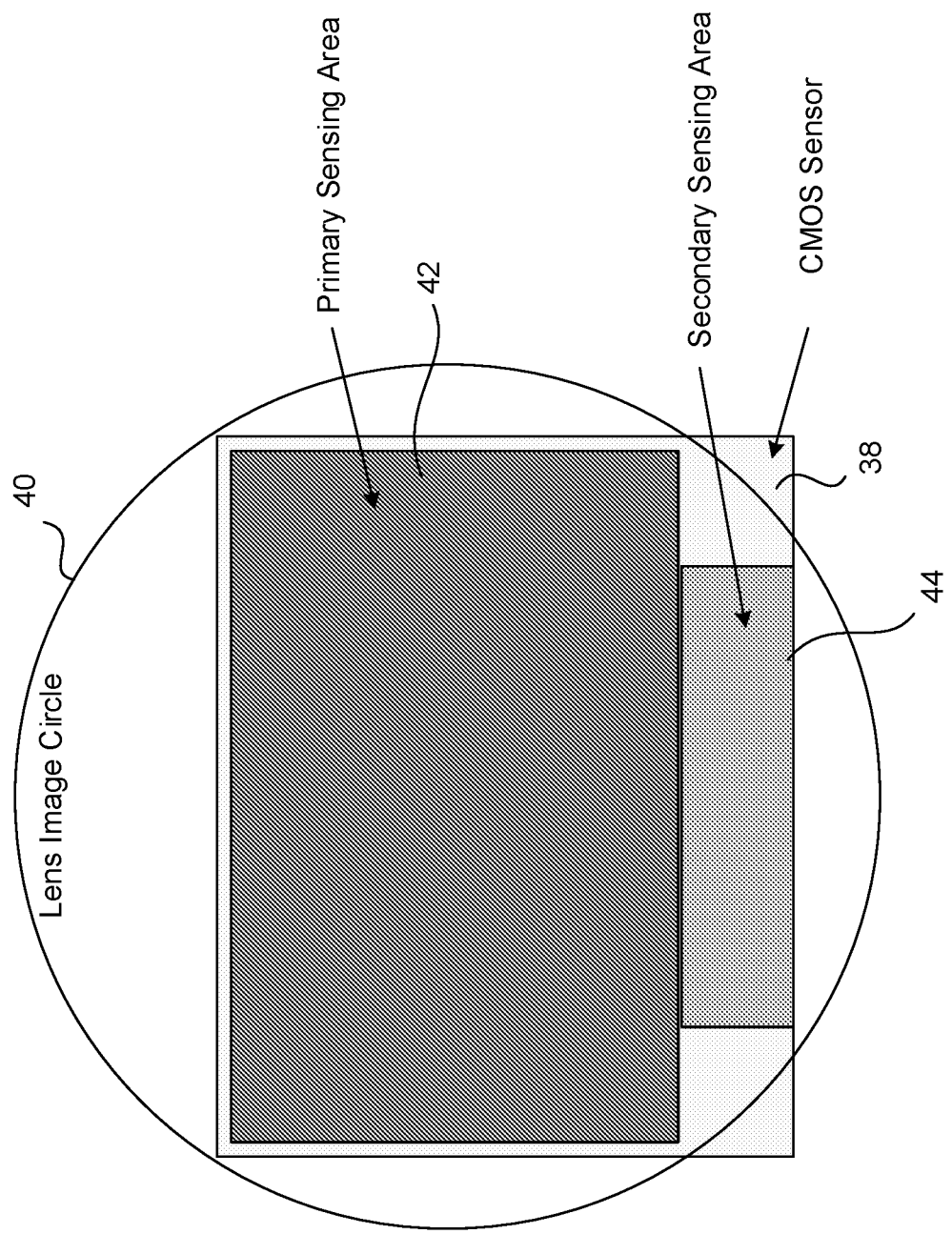
FIG. 4 is a schematic view of an image sensor in accordance with the present invention.

Typically, an image sensor is rectangular and is aligned to the center of the lens image circle of the primary lens 32. Referring now to FIG. 4, the primary lens 32 projects images into a primary lens circle area 40. The image sensor 38 (e.g., a CMOS image sensor) includes a primary sensing area 42 disposed within the primary lens circle area 40 and captures image data representative of at least a portion of the images projected by the primary lens 32. The image sensor 38 also includes secondary sensing area 44 that captures image data representative of images projected by the secondary lens 34 and is also within the primary lens circle area 40. In other examples, a second image sensor (separate from the primary image sensor) instead captures images projected by the secondary lens 34. The secondary sensing area may be disposed above or below or to either side (or both sides) of the primary sensing area, such that the secondary sensing area senses images focused by the secondary lens that are representative of images of the glass panel or windshield at or near the area sensed or captured by the primary sensing area of the at least one image sensor.

The image sensor 38 may include more rows than a typical rectangular image sensor to include an additional sensing area (e.g., ON Semi's AR0220's 1820×940 active pixels). When the extra active pixels rows are included outside the primary sensing area 42, but still inside the primary lens circle area 40, the extended area may be used to capture images of rain droplets on the windshield 31 (or other glass situated in front of the camera 30) via the secondary lens placement in front of the extended area. Therefore, the placement of the secondary lens 34 can be made such that one area 31a of the windshield glass 31 that is outside of the field of view of the normal forward viewing camera, is focused to the secondary sensing area 44 of the image sensor 38 for rain detection. This takes advantage of areas of a typical camera image that are not used for primary detections (e.g., lanes, traffic signs, forward vehicles, etc.). The secondary lens 34 may focus the rain sensing area 31a of the windshield glass 31 to one or multiple un-used image regions of image sensor 38. Thus, the extra cost of larger imager silicon die is avoided.

Therefore, the present invention provides for separate focusing of images of rain droplets or other precipitation (and/or dirt or debris) at the vehicle windshield and capturing of image data representative of the focused images, such that the system can recognize and discern and detect the rain or precipitation at the windshield (such as for a rain sensing system or the like that turns on and adjusts the rate of windshield wipers of the vehicle responsive to detection of rain or precipitation at the windshield). The system of the present invention provides for rain sensing and forward camera functions using a single forward viewing camera that views through the vehicle windshield. Optionally, although shown and described as being disposed at the vehicle windshield, the camera may be disposed behind and view through other transparent glass (or plastic) panels of the vehicle, such as other windows of the vehicle or such as other types of transparent panels disposed at the camera (such as protective panels that exterior cameras may be disposed behind).

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or imager of the camera may capture image data for image processing and the camera may comprise any suitable camera or sensing device or imager, such as, for example, an imager array comprising a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224;

7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

Optionally, the camera may comprise a forward viewing camera, such as disposed at a windshield electronics module (WEM) or the like. The forward viewing camera may utilize aspects of the systems described in U.S. Pat. Nos. 8,256,821; 7,480,149; 6,824,281 and/or 6,690,268, and/or U.S. Publication Nos. US-2015-0327398; US-2015-0015713; US-2014-0160284; US-2014-0226012 and/or US-2009-0295181, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A method for determining presence of water droplets at an outer side of a windshield of a vehicle, the method comprising:

equipping a vehicle with a vehicular vision system, the vehicular vision system having a camera disposed behind an inner side of the windshield of the equipped vehicle so as to view exterior of the equipped vehicle through the windshield, wherein the camera comprises (i) a primary lens, (ii) a secondary lens, and (iii) an imager, and wherein the imager comprises a primary sensing area and a secondary sensing area;

capturing, at the primary sensing area of the imager, image data representative of images focused at the imager by the primary lens;

capturing, at the secondary sensing area of the imager, image data representative of images focused at the imager by the secondary lens;

wherein the secondary lens is disposed between the primary lens and the imager, and wherein the primary sensing area of the imager comprises a central region of the imager, and wherein the secondary sensing area of the imager comprises a non-central region that is outside of the central region of the imager;

processing, via an image processor of a control of the vehicular vision system, image data captured by the imager at the primary sensing area and image data captured by the imager at the secondary sensing area; and determining, responsive to processing at the control of image data captured by the imager at the secondary sensing area, presence of water droplets at the outer side of the windshield of the equipped vehicle.

2. The method of claim 1, wherein processing at the control of image data captured by the imager at the primary sensing area is for a driving assistance system of the equipped vehicle.

3. The method of claim 2, wherein the processing at the control of image data captured by the imager at the secondary sensing area is for a rain sensing system of the equipped vehicle.

4. The method of claim 1, wherein the processing at the control of image data captured by the imager at the secondary sensing area is for a rain sensing system of the equipped vehicle.

5. The method of claim 1, wherein a first working distance of the primary lens is longer than a second working distance of the secondary lens.

6. The method of claim 1, wherein the camera comprises a cover glass element that is disposed between the secondary lens and the imager.

7. The method of claim 1, wherein the camera comprises a cover glass element disposed between the primary lens and the primary sensing area of the imager, and wherein the secondary lens is integrated into the cover glass element.

8. The method of claim 1, wherein the secondary lens comprises one selected from the group consisting of (i) a Fresnel lens, (ii) a cylindrical lens and (iii) a micro lens array.

9. The method of claim 1, wherein image data captured by the imager at the primary sensing area is different than the image data captured by the imager at the secondary sensing area.

10. A method for determining presence of water droplets at an outer side of a windshield of a vehicle, the method comprising:

equipping a vehicle with a vehicular vision system, the vehicular vision system having a camera disposed behind an inner side of the windshield of the equipped vehicle so as to view exterior of the equipped vehicle through the windshield, wherein the camera comprises (i) a primary lens, (ii) a secondary lens, and (iii) an imager, and wherein the imager comprises a primary sensing area and a secondary sensing area;

capturing, at the primary sensing area of the imager, image data representative of images focused at the imager by the primary lens;

capturing, at the secondary sensing area of the imager, image data representative of images focused at the imager by the secondary lens;

wherein the secondary lens is disposed between the primary lens and the imager, and wherein the primary sensing area of the imager comprises a central region of the imager, and wherein the secondary sensing area of the imager comprises a non-central region that is outside of the central region of the imager;

processing, via an image processor of a control of the vehicular vision system, image data captured by the imager at the primary sensing area and image data captured by the imager at the secondary sensing area;

wherein image data captured by the imager at the primary sensing area is different than the image data captured by the imager at the secondary sensing area;

wherein processing at the control of image data captured by the imager at the primary sensing area is for a driving assistance system of the equipped vehicle;

determining, responsive to processing at the control of image data captured by the imager at the secondary sensing area, presence of water droplets at the outer side of the windshield of the equipped vehicle; and wherein the processing at the control of image data captured by the imager at the secondary sensing area is for a rain sensing system of the equipped vehicle.

11. The method of claim 10, wherein a first working distance of the primary lens is longer than a second working distance of the secondary lens.

12. The method of claim 10, wherein the camera comprises a cover glass element that is disposed between the secondary lens and the imager.

13. The method of claim 10, wherein the camera comprises a cover glass element disposed between the primary lens and the primary sensing area of the imager, and wherein the secondary lens is integrated into the cover glass element.

14. The method of claim 10, wherein the secondary lens comprises one selected from the group consisting of (i) a Fresnel lens, (ii) a cylindrical lens and (iii) a micro lens array.

15. A method for determining presence of water droplets at an outer side of a windshield of a vehicle, the method comprising:

equipping a vehicle with a vehicular vision system, the vehicular vision system having a camera disposed behind an inner side of the windshield of the equipped vehicle so as to view exterior of the equipped vehicle through the windshield, wherein the camera comprises (i) a primary lens, (ii) a secondary lens and (iii) an imager, and wherein the imager comprises a primary sensing area and a secondary sensing area;

wherein a first working distance of the primary lens is longer than a second working distance of the secondary lens;

capturing, at the primary sensing area of the imager, image data representative of images focused at the imager by the primary lens;

capturing, at the secondary sensing area of the imager, image data representative of images focused at the imager by the secondary lens;

wherein the secondary lens is disposed between the primary lens and the imager, and wherein the primary sensing area of the imager comprises a central region of the imager, and wherein the secondary sensing area of the imager comprises a non-central region that is outside of the central region of the imager;

processing, via an image processor of a control of the vehicular vision system, image data captured by the imager at the primary sensing area and image data captured by the imager at the secondary sensing area;

determining, responsive to processing at the control of image data captured by the imager at the secondary sensing area, presence of water droplets at the outer side of the windshield of the equipped vehicle; and wherein the processing at the control of image data captured by the imager at the secondary sensing area is for a rain sensing system of the equipped vehicle.

16. The method of claim 15, wherein processing at the control of image data captured by the imager at the primary sensing area is for a driving assistance system of the equipped vehicle.

17. The method of claim 15, wherein the camera comprises a cover glass element that is disposed between the secondary lens and the imager.

18. The method of claim 15, wherein the camera comprises a cover glass element disposed between the primary lens and the primary sensing area of the imager, and wherein the secondary lens is integrated into the cover glass element.

19. The method of claim 15, wherein the secondary lens comprises one selected from the group consisting of (i) a Fresnel lens, (ii) a cylindrical lens and (iii) a micro lens array.

20. The method of claim 15, wherein image data captured by the imager at the primary sensing area is different than the image data captured by the imager at the secondary sensing area.

* * * * *